Feb. 14, 1933.   J. WERNER   1,897,875

PROCESS FOR TRANSFERRING PRINTS ON TO SURFACES

Filed Jan. 16, 1930

FIG. 1.

Removable backing layer on which the transfer picture is printed.
Image layer of the applied transfer picture.
Layer of a cellulose ester varnish.
Plate of wood, metal or the like to be decorated.

FIG. 2.

Image in cellulose ester varnish after subjecting the applied transfer to hot pressure.
Plate of wood, metal or the like to be decorated.

Inventor:
J. Werner
By: Marks & Clerk
Attys.

Patented Feb. 14, 1933

1,897,875

UNITED STATES PATENT OFFICE

JOHN WERNER, OF SWINEMUENDE, GERMANY

PROCESS FOR TRANSFERRING PRINTS ON TO SURFACES

Application filed January 16, 1930, Serial No. 421,316, and in Germany September 17, 1929.

The transference of prints (one-colour or multicolour prints) offers, more particularly on metal surfaces, considerable difficulties, since hitherto there was no suitable medium which so intimately united on the one hand with the metal surface and on the other hand with the print image that the applied image was sufficiently insensitive and resistant towards the actions of moisture, temperature change as well as towards mechanical stresses.

It is indeed known that cellulose ester lacquers, such as for example nitro- and acetyl-cellulose lacquers, produce extraordinarily tenacious coatings even on metal surfaces, but heretofore it was impossible to transfer on to such coatings prints which are produced in the usual manner by means of oil varnish colours, since such print colours, or the prints produced therewith, either do not adhere sufficiently on to the layer of cellulose ester lacquer or are attacked by the same and become more or less destroyed. Attempts have already been made to meet this deficiency by inserting between the image layer and the lacquer layer a neutral protective layer insensitive towards nitrocellulose, but this renders the process considerably more expensive and also does not yield completely satisfactory results.

It has now been found that one-colour and multicolour prints can be transferred on to coatings of cellulose ester lacquer in a very simple and at the same time very perfect manner by making the prints not, as otherwise usual, with oil-varnish colours, but by using therefor oil-free printing colours which are rubbed with cellulose ester solutions and the prints prepared therewith, after subsequent drying, are hot pressed under very high pressure on to the coatings, also dry, of cellulose ester lacquer.

The lacquer and image layers hereby soften to such an extent that they unite with one another as intimately as possible to form a unitary whole, and thereby adhere firmly on their support. After subsequent cooling the paper on which the image to be transferred was printed can be detached with water or in some other manner without the image firmly secured in the lacquer layer being thereby detrimentally affected in any way. Finally, in order to protect the said image from attack by outside influences it may be further coated with a suitable lacquer layer, more particularly a layer of cellulose ester lacquer.

The pressing of the image prepared with cellulose ester colours on to the layer of cellulose ester lacquer is effected in this process, as already mentioned, with application of very high pressures, preferably of pressures of about 200 kg./cm.$^2$ at temperatures of about 40–200° C. The height of the most favourable temperature depends on the particular properties of the cellulose ester lacquer used and also on the degree of dryness of the image to be transferred and of the lacquer layer on to which the image is transferred. If both are still comparatively fresh, i. e. only superficially dry, temperatures of 40° C. or below are already sufficient in order to produce a complete union of the two layers. If, however, the layers are already strongly dried, their union must be effected at correspondingly higher temperatures, which, according to circumstances, may amount to 200° C. and over.

The accompanying drawing illustrates on an exaggerated scale the process which comprises this invention. Fig. 1 represents a sectional elevation of a support provided with a surface layer of cellulose ester varnish with the transfer picture applied thereto, but before application of pressure and heat. Fig. 2 represents the same sectional view as Fig. 1 but after the application of hot pressure and the removal of the backing paper. It will be seen that the image layer of the transfer picture intimately unites with the layer of cellulose ester varnish upon the support to form a more or less homogeneous single layer of cellulose ester varnish containing the transfer image.

The new process is preeminently suited for the durable transferences of prints (images) on metal surfaces, but it may advantageously be used in similar manner for transferring prints on to surfaces of other substances also, such as, for example, wood, pasteboard, fabric, leather, and so forth, on which cellulose ester lacquers form tenacious coatings which are applied in the usual manner by spraying or the like.

What I claim is:

1. Process for the transference of transfer prints on to surfaces, in which the said surfaces are first provided in known manner with a coating of a cellulose ester lacquer and on this coating, after subsequent drying, the dry image to be transferred, printed with oil-free printing colours made by rubbing the colours with cellulose ester solutions, is hot pressed with employment of high pressure, as set forth.

2. Process for the transference of transfer prints on to surfaces, in which the said surfaces are first provided in known manner with a coating of a cellulose ester lacquer and on this coating, after subsequent drying, the dry image to be transferred, printed with oil-free printing colours made by rubbing the colours with cellulose ester solutions, is hot pressed with employment of a pressure of about 200 kg./cm.$^2$, as set forth.

3. Process for the transference of transfer prints on to surfaces, in which the said surfaces are first provided in known manner with a coating of a cellulose ester lacquer and on this coating, after subsequent drying, the dry image to be transferred, printed with oil-free printing colours made by rubbing the colours with cellulose ester solutions, is pressed at temperatures of 40–200° C. with employment of high pressure, as set forth.

4. Process for the transference of transfer prints on to surfaces, in which the said surfaces are first provided in known manner with a coating of a cellulose ester lacquer and on this coating, after subsequent drying, the dry image to be transferred, printed with oil-free printing colours made by rubbing the colours with cellulose ester solutions, is pressed at temperatures of 40–200° C. with employment of a pressure of about 200 kg./cm.$^2$ as set forth.

In testimony whereof I have signed my name to this specification.

JOHN WERNER.